United States Patent
Funaki et al.

(10) Patent No.: US 6,203,733 B1
(45) Date of Patent: Mar. 20, 2001

(54) PROCESS FOR PRODUCING GRANULATED POLYTETRAFLUOROETHYLENE POWDER

(75) Inventors: Atsushi Funaki; Teruo Takakura, both of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/269,170

(22) PCT Filed: Jul. 23, 1998

(86) PCT No.: PCT/JP98/03295
§ 371 Date: Mar. 24, 1999
§ 102(e) Date: Mar. 24, 1999

(87) PCT Pub. No.: WO99/05203
PCT Pub. Date: Feb. 4, 1999

(30) Foreign Application Priority Data

Jul. 24, 1997 (JP) .................................................... 9-198910
Oct. 22, 1997 (JP) .................................................... 9-290108

(51) Int. Cl.$^7$ ................................. C08J 3/12; C08L 27/18

(52) U.S. Cl. ............................................. 264/117; 528/494
(58) Field of Search .............................. 264/117; 528/494

(56) References Cited

U.S. PATENT DOCUMENTS 6,099,774 * 8/2000 Lohr et al. ............................ 264/117

FOREIGN PATENT DOCUMENTS

| 0 448 995 | 10/1991 | (EP) . |
| 0 455 210 | 11/1991 | (EP) . |
| 0937738 * | 8/1999 | (EP) . |
| 1100388 | 1/1968 | (GB) . |
| 1 137 349 | 12/1968 | (GB) . |

* cited by examiner

Primary Examiner—Donald R. Wilson
(74) Attorney, Agent, or Firm—Oblon, Spivak, McClelland, Maier & Neustadt, P.C.

(57) ABSTRACT

A polytetrafluoroethylene powder having an average particle size of at most 200 $\mu$m is stirred and granulated in a 2 phase liquid medium comprising water and perfluoroalkyl alkyl ether, to obtain a granulated powder of polytetrafluoroethylene.

7 Claims, No Drawings

PROCESS FOR PRODUCING GRANULATED POLYTETRAFLUOROETHYLENE POWDER

BACKGROUND OF THE INVENTION

1. Technical Field

The present invention relates to a method for preparing a granulated powder of polytetrafluoroethylene (hereinafter referred to simply as PTFE).

2. Background Art

PTFE is subjected to molding in a powder form, since it can not be melt-molded like a thermoplastic resin. Accordingly, the PTFE molding powder is required to have specific powder characteristics. One of the characteristics is that the powder flowability is good. It is also required that the apparent specific gravity is large, and it is hardly broken and is not so brittle.

A primary powder obtained by finely pulverizing a granular solid of PTFE obtained by suspension polymerization, usually has an average particle size of at most 200 μm, but it does not have the above mentioned powder characteristics, and accordingly, such a primary particle of PTFE is stirred and granulated in a solvent and used for molding. As a method for granulating PTFE, there is a method wherein only an water-insoluble organic liquid is used as a solvent, or a method wherein granulation is carried out in a two phase liquid medium comprising water and an organic liquid.

The present invention belongs to the later method. As the organic liquid to be used in this method, it is known to employ an organic liquid which is water-insoluble and which has a surface tension at 25° C. of at most 35 dyne/cm to wet PTFE and a solvent-recovery temperature, i.e. a boiling point, of from about 30 to 150° C. to obtain a PTFE granulated powder having a suitable softness (JP-B-44-22619, JP-B-54-40099 and JP-A-57-18730).

Specific examples of such an organic liquid include chlorofluorocarbons in addition to aliphatic hydrocarbons and aromatic hydrocarbons. Chlorofluorocarbons may, for example, be trichlorotrifluoroethane, trichlorofluoromethane difluorotetrachloroethane, $Cl(CF_2CFCl)_nCl$ (wherein n is integer of from 2 to 4), and trichloropentafluoropropane. Further, hydrochlorofluorocarbons such as 1,3-dichloro-1,1,2,2,3-pentafluoropropane and a hydrofluorocarbon such as $C_6F_{13}H$ may also be mentioned, and these organic liquids are mainly used for practical granulation.

Meanwhile, in recent years, destruction of the ozone layer has been internationally taken up as an environmental problem of global scale, and use of certain chlorofluorocarbons which are considered to be causal substances, has been prohibited. Therefore, there is substantial demand for developing a substitute for chlorofluorocarbons to be used for preparing the granulated powder of PTFE.

DISCLOSURE OF THE INVENTION

The present invention provides a method for industrially advantageously preparing a granulated powder of PTFE having excellent powder flowability and a high apparent specific gravity, without using chlorofluorocarbons or perfluorocarbons which have large ozone layer destruction coefficients and which cause warming up of the earth.

BEST MODE FOR CARRYING OUT THE INVENTION

The present invention is a method for preparing a granulated powder of polytetrafluoroethylene, which comprises stirring and granulating a polytetrafluoroethylene powder having an average particle size of at most 200 μm in a two phase liquid medium comprising water and a perfluoroalkyl alkyl ether (hereinafter referred to as PFAE) of the formula 1:

R—O—R'              Formula 1 wherein R is a $C_{2-6}$ perfluoroalkyl group, and R' is a $C_{1-2}$ alkyl group.

The PTFE primary powder to be used in the present invention, includes, for example, a homopolymer of tetrafluoroethylene (hereinafter referred to as TFE) and a polymer of TFE modified with not more than 2 wt % of a copolymerizable monomer. Examples of the above modifying agent include a $C_{3-6}$ perfluoroalkene (such as hexafluoropropylene) and a $C_{3-6}$ perfluoro(alkyl vinyl ether) (such as perfluoro(propyl vinyl ether)). The copolymer modified with such a modifying agent, has no melt-processability just like PTFE.

As the PTFE primary powder, such a polymer finely pulverized to an average particle size of at most 200 μm and non-baked, may be employed. If the particle size is large, the apparent specific gravity of the granulated powder tends to be low, voids are likely to remain in the molded product, and the uniformity of the molded product tends to be impaired. Accordingly, one having an average particle size of at most 70 μm, is preferably employed. In the present invention, the non-baked PTFE powder means a PTFE powder which has not been heated to a temperature of at least the melting point after the polymerization, and such a powder is suitable for granulation.

If the boiling point of PFAE to be used in the present invention, is too high, the temperature for recovery of PFAE tends to be high, whereby the granulated powder tends to be hard, and if the boiling point is too low, coagulation tends to be incomplete, and the granulated powder tends to be easily broken by a small external force. The range of the boiling point of PFAE is preferably from 25 to 80° C.

In the formula 1, R may be of a straight chain structure or a branched structure, and the polyfluoroalkyl group R is preferably a perfluoroalkyl group.

Specifically, PFAE is preferably $CF_3CF_2CF_2CF_2OCH_3$, $CF_3CF_2CF_2CF_2OCH_2CH_3$, $CF_3CF_2CF_2OCH_3$ or $(CF_3)_2CFOCH_3$. These PFAE may be used alone or in combination as a mixture of two or more of them.

PFAE is free from the possibility of destroying the ozone layer and yet has a characteristic such that the coefficient for warming up the earth is lower than the perfluoro compound, since it has hydrogen atoms. For example, an estimated value of the life time as an index for the coefficient for warming up the earth, is about 100 years with $C_6F_{14}$ and from 20 to 30 years with $C_6F_{13}H$, whereas it is as small as 4.1 years with $F(CF_2)_4OCH_3$, 1.9 years with $F(CF_2)_3OCH_3$ and 1.2 years with $F(CF_2)_4OC_2H_5$.

Further, PFAE has a surface tension which is small, for example 13.6 dyne/cm of $CF_3CF_2CF_2CF_2OCH_2CH_3$ as compared with at least 16 dyne/cm of chlorofluorocarbon. Accordingly, by using PFAE, the PTFE powder will be wettened in the medium and will readily be coagulated with stirring, to give a granulated powder, of which the interior is uniform with little voids and which has a high apparent specific gravity and improved flowability with a smooth surface.

Further, when PFAE is used alone as a medium, the interior of the PTFE granulated product tends to be hard, but by employing the two phase liquid medium comprising PFAE and water, the PTFE powder will be wetted to a proper degree and coagulation will not excessively proceed, whereby a granulated product having a proper softness can be obtained, and the physical properties of the molded product will be improved.

The ratio of the water/PFAE/PTFE powder to be used in the present invention, is usually preferably 2 to 20/0.2 to 2/1 (by weight ratio).

In the present invention, the temperature during the contact treatment with water is important, it is preferably at a temperature of not higher than the boiling point of PFAE, specifically from 10 to 50° C., particularly preferably from 20 to 40° C. Further, the treating time is usually from about 1 minute to 10 hours, within the above temperature range.

In the present invention, the contact treatment with water is carried out by stirring the mixture of PTFE and water, wetted with a granulation medium, under the above mentioned conditions in a treating apparatus equipped with stirring vanes. Further, in order to obtain a granulated powder having a uniform particle size distribution, stirring with a certain intensity is preferred. As a specific stirring condition, the peripheral speed of stirring vanes is usually from 1 to 50 m/sec.

It is possible to prepare a granulated powder of a PTFE composition having a filler such as glass fibers, carbon fibers, a powder of bronze or graphite, a melt-moldable other fluorine resin, or a heat resistant resin, incorporated to a PTFE primary powder. In a case where a filler is to be incorporated, it is possible to incorporate a PTFE colloidal dispersion having an average particle size of from 0.1 to 0.5 $\mu$m, which exhibits effects for preventing separation of the filler. Such incorporation is useful particularly in a case where the blend ratio of the filler is substantial. The amount of the colloidal PTFE is preferably from 1 to 5 wt %, based on the PTFE powder. PTFE powder and other filler and fluorine resin or the like, are uniformly mixed in a dry system, and the resulting powder is stirred and mixed in a two phase liquid medium comprising water and PFAE.

In the method of the present invention, the procedure is substantially the same as in the conventional method for preparing a PTFE powder, except that PFAE is used as an organic liquid. Such a conventional granulation method is disclosed, for example, in the above mentioned patent publications and in e.g. JP-B-47-1549, JP-B-49-17855 and JP-A-47-84936.

The granulated powder of PTFE obtained by the method of the present invention, is one having an average particle size of from 200 to 800 $\mu$m (provided that it is at least 5 times the average particle size of the starting material powder), an apparent specific gravity of from 0.50 to 1.00 and a powder flowability (angle of repose) of from about 30 to 45 degrees, particularly from 30 to 40 degrees, and it is excellent in the powder characteristics and is relatively soft, with a good pressure-transmitting property at the time of compression molding, whereby a dense molded product excellent in tensile strength and elongation and having a small vapor permeability, will be given.

Now, the present invention will be described with reference to Examples. However, it should be understood that the present invention is not limited to such Examples. In the Examples, the methods for measuring the properties of the granulated powder and the physical properties of the molded product, are as follows.

Average Particle Size

From the top to the bottom, 10, 20, 32, 48, 60 and 80 mesh standard sieves were stacked, and a powder was put on the 10 mesh sieve, and the weight proportions of the powder remaining on the respective sieves were obtained, whereupon the 50% particle size on a logarithmic probability paper was taken as the average particle size ($\mu$m).

Apparent Density

In accordance with JIS K6891, a sample was dropped from a dumper into a stainless steel cylindrical container having an internal capacity of 100 cc and leveled by a flat plate, whereupon the weight of the sample was divided by 100 cc, and the obtained value was taken as the apparent density.

Angle of Repose

A stainless steel funnel having a dimension of an inner diameter at the top of 40 mm, an inner diameter at the bottom of 6 mm and a height of 40 mm and provided with an orifice having an inner diameter of 6 mm and a length of 3 mm at the outlet, is set with a distance of 20 mm from the floor surface, and a powder to be measured, is permitted to gently flow through this funnel. The powder will be piled up on the floor and eventually, the forward and of the pile will reach the outlet of the funnel. The powder will be piled up substantially in a conical shape, and the radius r (mm) of this bottom surface is measured, whereupon the angle of repose is obtained by the following formula. To carry out the measurement of this "angle of repose", the sample powder is preliminarily sufficiently dehumidified, and the static electricity is preliminarily removed. The measurement is carried out at 23° C.

$$\text{Angle of repose } \theta = \tan^{-1}(20/r)$$

Vapor Permeability 300 g of a test powder was preliminarily molded in a cylindrical mold having an inner diameter of 70 mm under a pressure of 300 kg/cm$^2$ and then the temperature was raised to 370° C. at a rate of 150° C. per hour in an electric furnace equipped with a stirrer, whereupon baking was carried out at 370° C. for 8 hours, followed by cooling to room temperature at a rate of 40° C. per hour. From the obtained block having a diameter of about 70 mm and a height of 80 mm, a tape of 0.1 mm was cut out by a lathe, and then this tape was subjected to a vapor permeation test at 40° C. in accordance with JIS Z0208, whereby the vapor permeability is a value represented by a unit of g/m$^2$·24 hr.

Tensile Strength and Elongation

Preliminary molding was carried out under 500 kg/cm$^2$, followed by baking at 380° C. for 3 hours and then by cooling outside the furnace to obtain a sheet having a thickness of 1.5 mm, from which a sample was punched out by a dumbbell number 3 die as stipulated in JIS K6031, whereby the strength and elongation at breakage were measured, and the obtained values were taken as the tensile strength (kg/cm$^2$) and the tensile elongation (%)

Breakdown Voltage

A tape-shaped test specimen (width: 30 mm, thickness: 0.10±0.01 mm, length: about 1 m) stipulated in JIS K6891 was sandwiched between electrodes (a pair of thoroughly polished brass spheres having a diameter of 12.5 mm), and a load of 500 gf was exerted. Voltage was uniformly raised at a rate of 1 kV/sec. from 0 in air, whereby the breakdown voltage (kV) was measured. The test was carried out ten times by moving the measuring points by at least 50 mm from one point to another, and the average value was taken as the breakdown voltage (kV).

EXAMPLE 1

A mixed liquid comprising 1500 ml of water and 300 ml of CF$_3$CF$_2$CF$_2$CF$_2$OCH$_3$ (boiling point: 60° C.) was put into a stainless steel cylindrical granulating tank having a capacity of 3 l, provided with two baffle plates and having a stirrer with two flat blade vanes at the center, and 600 g of PTFE powder of granular type having an average particle size of 35 μm was further added, whereupon stirring was continued at a rotational speed of 1200 rpm for 5 minutes, and then stirring was further carried out for 30 minutes at a rotational speed of 600 rpm to coagulate and granulate the PTFE powder. After completion of the stirring, the granulated product was separated by a 60 mesh metal net, and the filtered solid was dried as it was, at 150° C. for 16 hours to obtain a granulated powder.

The average particle size of the granulated powder was 500 μm, the apparent specific gravity was 0.72, and the powder flowability (angle of repose) was 36 degrees. Further, the vapor permeability (g/cm$^2$·24 hr) of the molded product prepared by using the granulated powder, was 0.8, the tensile strength (kg/cm$^2$) was 430, the tensile elongation (%) was 360, and the breakdown voltage (kV) was 7.0.

EXAMPLE 2

The operation was carried out in the same manner as in Example 1 except that instead of $CF_3CF_2CF_2CF_2OCH_3$, $CF_3CF_2CF_2CF_2OCH_2CH_3$ (boiling point: 78° C.) was used. The average particle size of the obtained granulated powder was 550 μm, the apparent specific gravity was 0.81, and the powder flowability (angle of repose) was 37 degrees. Further, the vapor permeability (g/cm$^2$·24 hr) of the molded product prepared by using the granulated powder, was 0.7, the tensile strength (kg/cm$^2$) was 420, the tensile elongation (%) was 370, and the breakdown voltage (kV) was 7.5.

EXAMPLE 3

The operation was carried out in the same manner as in Example 1 except that instead of $CF_3CF_2CF_2CF_2OCH_3$, $CF_3CF_2CFOCH_3$ (boiling point: 34° C.) was used. The average particle size of the obtained granulated powder was 600 μm, the apparent specific gravity was 0.75, the powder flowability (angle of repose) was 37 degrees. Further, the vapor permeability (g/cm$^2$·24 hr) of the molded product prepared by using the granulated powder, was 0.9, the tensile strength (kg/cm$^2$) was 420, the tensile elongation (%) was 370, and the breakdown voltage (kV) was 6.5.

EXAMPLE 4

The operation was carried out in the same manner as in Example 1 except that instead of $CF_3CF_2CF_2CF_2OCH_3$, $(CF_3)_2CFOCH_3$ (boiling point: 29° C.) was used. The average particle size of the obtained granulated powder was 520 μm, the apparent specific gravity was 0.76, and the powder flowability (angle of repose) was 35 degrees. Further, the vapor permeability (g/cm$^2$·24 hr) of the molded product prepared by using the granulated powder, was 0.8, the tensile strength (kg/cm$^2$) was 450, the tensile elongation (%) was 370, and the breakdown voltage (kV) was 6.5.

EXAMPLE 5

Reference Example

The operation was carried out in the same manner as in Example 1 except that instead of $CF_3CF_2CF_2CF_2OCH_3$, trichlorofluoromethane (boiling point: 24° C.) was used. The average particle size of the obtained granulated powder was 620 μm, the apparent specific gravity was 0.62, and the powder flowability (angle of repose) was 37 degrees. Further, the vapor permeability (g/cm$^2$·24 hr) of the molded product prepared by using the granulated powder was 0.9, the tensile strength (kg/cm$^2$) was 410, the tensile elongation (%) was 340, and the breakdown voltage (kV) was 5.5.

Industrial Applicability

By the preparation method of the present invention, a PTFE granulated powder having excellent powder flowability and high specific gravity, can be obtained. Further, the PTFE granulated powder presents a PTFE molded product which is excellent in the mechanical properties and which has a low vapor permeability and a high breakdown voltage.

What is claimed is:

1. A method for preparing a granulated powder of polytetrafluoroethylene, which comprises stirring and granulating a polytetrafluoroethylene powder having an average particle size of at most 200 μm in a two phase liquid medium comprising water and a perfluoroalkyl alkyl ether of the formula 1:

$$R\text{—}O\text{—}R' \qquad \text{Formula 1}$$

wherein, R is a $C_{2\text{-}6}$ perfluoroalkyl group, and R' is a $C_{1\text{-}2}$ alkyl group.

2. The method according to claim 1, wherein the perfluoroalkyl alkyl ether is at least one member selected from the group consisting of $CF_3CF_2CF_2CF_2OCH_3$, $CF_3CF_2CF_2CF_2OCH_2CH_3$, $CF_3CF_2CF_2OCH_3$ and $(CF_3)_2CFOCH_3$.

3. The method according to claim 2, wherein the perfluoroalkyl alkyl ether is $CF_3CF_2CF_2CF_2OCH_3$, $CF_3CF_2CF_2OCH_3$ or $(CF_3)_2CFOCH_3$.

4. The method according to claim 1, wherein the polytetrafluoroethylene powder is a composition containing a filler.

5. The method according to claim 1, wherein in the granulation, the weight ratio of the water/the perfluoroalkyl alkyl ether/the polytetrafluoroethylene powder is 2 to 20/0.2 to 2/1.

6. The method according to claim 1, wherein the granulation treatment temperature ranges from 10 to 50° C.

7. The method according to claim 1, wherein the granulated powder of polytetrafluoroethylene has an average particle size of from 200 to 800 μm, an apparent specific gravity of from 0.50 to 1.00 and a powder flowability of from 30 to 45 degrees.

* * * * *